2,995,552
PROCESS FOR THE HALOGENATION OF PIGMENT AND VAT DYE INTERMEDIATES
Guido R. Genta, Snyder, N.Y., assignor to Allied Chemical Corporation, a corporation of New York
No Drawing. Filed Dec. 26, 1957, Ser. No. 705,132
5 Claims. (Cl. 260—265)

This invention relates to processes for reacting finely divided polycyclic organic compounds which are insoluble or sparingly soluble in water as well as in organic liquids. Illustrative of such organic compounds are the dibenzanthrones, isodibenzanthrones, pyroanthrones, anthanthrones, dibenzpyrenequinones, indanthrones, flavanthrones, indigos, thioindigos and phthalocyanine compounds.

In the manufacture of vat dyes and pigments and phthalocyanine dyes and pigments, it is necessary or desirable to react a suspension of a finely divided polycyclic organic compound containing chromophoric groups in an organic liquid such as nitrobenzene, mono-, di- and trichlorobenzenes, toluene, xylene, etc., in which the polycyclic compound is insoluble or sparingly soluble. The more important reactions thus carried out are halogenations, particularly chlorinations and brominations, alkylations, acylations, nitrations, esterifications and etherifications. As heretofore carried out, these reactions proceeded very slowly, probably because the polycyclic compound, even though finely ground, is in the form of hard crystalline particles which react very slowly. Moreover, the reaction product (such as for example as chloroindanthrone in the chlorination of indanthrone) coats the surface of the crystals of the reactant material, which thus becomes indifferent to further chemical attack by the other reactant. As a result, the reaction product is contaminated with considerable of the unreacted starting material.

The present invention overcomes the above objections and difficulties and results in a reaction product of markedly improved purity in materially less time. In accordance with the present invention, the reaction of polycyclic organic compounds suspended in finely divided solid state in organic liquids with another reactant in the liquid or gaseous phase is carried out in the presence of a solid finely divided hard crystalline water-soluble abrasive material, while agitating the mixture. When the reaction is complete, the organic liquid medium is separated from the mixture of abrasive material and reaction product and the latter separated from the abrasive material by dissolving out the latter by washing the mixture with water, leaving the reaction product substantially uncontaminated with the abrasive material. The preferred water-soluble abrasive materials are salts; particularly preferred are the alkali metal halides such as potassium chloride and sodium chloride. Of these two salts, sodium chloride is preferred because of its cheapness and ready availability.

Halogenations, particularly chlorinations and brominations, alkylations, acylations, nitrations, esterifications and etherifications of polycyclic organic compounds containing chromophoric groups, particularly vattable chromophoric groups (i.e., vat dyes and vat dye intermediates), can be carried out in accordance with the present invention with a material saving in reaction time and usually with an improvement in purity of product and yield. The salt, being in the form of hard crystals belonging to the cubic system, exercises a grinding and scraping action on the suspended organic compound, so that as the reaction proceeds the surfaces of the suspended organic compound are ground and scraped, continuously exposing fresh surfaces to attack by the other reactant which is in the gaseous or liquid phase, thus speeding up the reaction as well as resulting in a reaction product of greater purity. Moreover, the growth of crystals of the organic compounds, which growth usually occurs when a poorly soluble organic compound is heated in an organic solvent, is inhibited by the presence of the added salt, which exercises a comminuting action upon these crystals. The resulting reduction in size of the particles of the organic compound being reacted increases the speed of the reaction. It will be understood this invention is not to be limited to the above explanation, which is advanced chiefly to facilitate a better understanding of the invention.

The addition of the salt to the suspension of solid organic compound containing chromophoric groups, particularly vattable chromophoric groups, in the organic liquid improves the fluidity of the reaction mass thereby permitting the use of larger batches than would be feasible when carrying out the reaction without the added salt. When the reactions are carried out, as has heretofore been customary, without the added salt, the reaction mass is viscous, so much so that it is difficult to obtain adequate dispersion of the reactants in the organic liquid and this even with constant agitation. The presence of the added salt, on the other hand, not only improves the fluidity of the reaction mass but has the further important advantage of greatly improving the filtration to which the reaction mass, when the reaction has gone to completion, is subjected, to effect separation of the reaction product from the organic liquid. This improvement in the filtration results in less retention on the reaction product of the organic liquid medium in which the reaction is carried out with consequent improvement in the purity of the product.

The salt used should not be too coarse and should preferably have a fineness of between about 10 and 100 mesh, i.e., should have an average particle size (size of the longest dimension) within the range of from about 0.15 to 2 mm. The amount of salt used in each case should be such as to produce a slurry of reasonably good mobility. Good results are obtained with from about 1 to 2 parts of salt by weight per part of solid organic compound. Less than one part of salt by weight per part of solid organic compound is not recommended. The use of larger proportions than 2 parts of salt by weight per part of solid organic compound, while effective, is generally uneconomical.

The amount of organic liquid in which the solid organic compound is suspended desirably is from about 5 to about 20 parts by weight per part of solid organic compound to be reacted. These ratios are not critical but represent those usually employed for optimum results.

Good results are obtained in the practice of the present invention in conventional agitation equipment; that is to say, high speed agitation is not necessary, although helpful.

Upon completion of the reaction the salt is removed from the reaction product by extraction with water. For example, the reaction mixture may be filtered to separate the organic liquid from the solids, including the salt and the reaction product, and the filter cake thus obtained mixed with water and steam distilled to remove the organic liquid completely. The salt is thus completely dissolved in the aqueous steam distillation residue and is removed from the solid reaction product by filtration.

The practice of the present invention is particularly advantageous in carrying out chlorination reactions of polycyclic organic compounds containing vattable chromophoric groups (i.e., vat dyes and vat dye intermediates) which, as well as the chlorine, are practically insoluble in the organic liquid and require the use of elevated temperatures of the order of 140° to 175° C., and high boiling organic liquids. For example, chlorinations of dibenzanthrone, which are normally run in high boiling organic liquids such as trichlorobenzene, nitrobenzene and phthalic anhydride, can be carried out more rapidly in accordance with the present invention to produce, for example, a tetrachloro derivative.

When indanthrone (Carbanthrene Blue RS) is chlorinated in an organic liquid such as nitrobenzene in accordance with prior known procedures, a dichloro compound is obtained only after a long reaction period of the order of 12 hours or longer, whereas by carrying out the chlorination in dichlorobenzene in accordance with the present invention, the dichloro compound (15° chlorine) is obtained after 3 hours. Higher chlorinated compounds containing up to 36% chlorine, corresponding to a heptachloroindanthrone, are easily obtained by employing the procedure of the present invention.

Copper phthalocyanine suspended in an organic liquid such as dichlorobenzene can be chlorinated more rapidly and to a higher chlorine content by conducting the chlorination in accordance with the present invention.

The following examples are given for purposes of illustrating the invention. It will be understood the invention is not limited to these examples. In these examples, as well as throughout the specification, the parts are by weight and the temperatures are in degrees centigrade.

*Example I*

100 parts of dry micropulverized dibenzanthrone were stirred in 800 parts o-dichloro benzene, together with 100 parts of ground dairy salt (NaCl, 20–40 mesh). The mass was heated to 140–145° and chlorine gas was passed through the agitated mass for 16 hours. The mixture was filtered, diluted with 300 parts of water and steam distilled to remove residual o-dichlorobenzene. The distillation residue was filtered and the filter cake was washed with water.

The product obtained was essentially a tetrachlorodibenzanthrone having a chlorine content of 25%. The compound, when dissolved in sulfuric acid and made into an aqueous paste, dyed cotton fabrics in a very fast navy blue shade of excellent fastness properties. When the chlorination was repeated without the addition of salt, about 40 hours were required to obtain the desired tetrachloro product.

*Example II*

80 parts of dry, micropulverized indanthrone and 80 parts of ground dairy salt (20–40 mesh) were suspended in 800 parts of o-dichlorobenzene. The mixture was heated to 75°–80° C. with agitation. Chlorine gas was passed into the agitated mass during 3 hours at 75°–80° C. The mass was filtered and the filter cake was steam distilled. The resulting chlorinated compound contained 18% chlorine, corresponding to 2.5 atoms chlorine.

The resulting chlorinated compound, when reduced with aluminum powder in concentrated sulfuric acid in known manner, showed an analysis of 15% chlorine, and consisted of a very pure 3,3'-dichloroindanthrone. When the chlorination was repeated, omitting the addition of salt, about 15 hours were required to obtain the same degree of chlorination.

*Example III*

80 parts of dry, micropulverized indanthrone and 80 parts of ground dairy salt (20–40 mesh) were suspended in 800 parts of o-dichlorobenzene. The mixture was heated to 75°–80° C. with agitation. Chlorine gas was passed into the agitated mass at 75°–80° C. for a 16 hour period. The mass was filtered and the filter cake was steam distilled. The product thus obtained, when dried, had a chlorine content of 36.5%, corresponding to a content of about 7 atoms of chlorine.

The product is in the form of uniform yellow crystals and is useful as a yellow pigment.

*Example IV*

50 parts of dry, pulverized copper phthalocyanine were slurried in 400 parts trichlorobenzene. 75 parts of ground dairy salt (20–40 mesh) were added and the mass agitated. 10 parts cuprous chloride catalyst and 200 parts of trichlorobenzene were added, and the mass was heated with agitation to 160°–170°. Chlorine gas was then introduced into the agitated mass at 160°–170° for 24 hours. The product isolated as in Example I had a chlorine content of 40%.

By carrying out the chlorination for 40 hours under otherwise similar conditions, a chlorinated phthalocyanine pigment of 44% chlorine content was obtained.

Products of markedly lower degree of chlorination were obtained when the foregoing chlorinations were performed in the absence of salt.

*Example V*

43 parts of dry, micropulverized indigo powder were slurried in 363 parts dry nitrobenzene. 70 parts dry, ground potassium chloride (40–60 mesh) were added and the mass was cooled to 15°–20° with agitation. 128 parts of bromine were added over a period of 3–4 hours to the agitated mixture, which was maintained at a temperature below 35° C. The agitated mass was held at 30°–35° for ½ hour longer and then slowly heated during 4 hours to 125°–130°, and maintained at this temperature for 3 hours to complete the bromination. The reaction mixture was cooled to 80°–85°, and filtered, and the filter cake was freed of nitrobenzene by steam distillatoin. The product obtained showed a bromine content of 54% and consisted of a substantially pure tetrabromindigo.

*Example VI*

25 parts of dry, pulverized dihydroxydibenzanthrone disodium salt were suspended in 400 parts trichlorobenzene, 40 parts of ground dairy salt (20–40 mesh) were added while agitating the mass. 50 parts of potassium carbonate were added and the mass was heated to 170°. 60 parts of methyl ester of p-toluenesulfonic acid were added, and the reaction mixture was heated with agitation at 170°–175° for 6 hours. Dimethoxydibenzanthrone formed was isolated by filtration and the filter cake was steam distilled to remove residual solvent.

The dimethoxydibenzanthrone product thus obtained dyed cotton in green shades of superior brightness as compared to those produced with the dye obtained in the same manner but without the use of salt. This indicates that the process of the invention provides a more complete reaction under the foregoing conditions than takes place in the absence of the salt.

It will be noted the present invention provides a process of reacting finely divided polycyclic organic compounds which are insoluble or sparingly soluble in water, as well as in organic liquids, suspended in such liquids with another reactant in the gaseous or liquid phase, and results in the production of the desired reaction products in materially less time and usually of improved purity.

In the claims the expression "fluid" is used to mean either the gaseous or liquid state. The expression "substantially insoluble" employed in the claims, it will be understood, includes compounds which are sparingly soluble as well as compounds which are for all practical purposes insoluble in the specified media.

Since certain changes may be made in carrying out the above process without departing from the scope of this invention, it is intended that all matter contained in the above description shall be interpreted as illustrative and not in a limiting sense.

What is claimed is:

1. The process of chlorinating indanthrone which comprises suspending finely divided solid indanthrone in chlorinated benzene, adding finely divided water-soluble salt from the group consisting of sodium chloride and potassium chloride to said suspension in amount not substantially less than the amount of said indanthrone, heating the mixture to a temperature of 75° to 80° C., passing chlorine gas through said suspension at a temperature of 75° to 80° C. while agitating, separating the salt and chlorinated indanthrone from the chlorinated benzene, steam distilling the separated mixture of salt and chlorinated indanthrone to remove residual chlorinated benzene and separating the chlorinated indanthrone from the aqueous solution of salt formed in the steam distillation of said mixture.

2. The process of chlorinating dibenzanthrone which comprises suspending finely divided solid dibenzanthrone in chlorinated benzene, adding finely divided water-soluble salt from the group consisting of sodium chloride and potassium chloride to said suspension in amount not substantially less than the amount of said dibenzanthrone, heating the mixture to a temperature of 140° to 145° C., passing chlorine gas through said suspension at a temperature of 140° to 145° C. while agitating, separating the salt and chlorinated dibenzanthrone from the chlorinated benzene, steam distilling the separated mixture of salt and chlorinated dibenzanthrone to remove residual chlorinated benzene and separating the chlorinated dibenzanthrone from the aqueous solution of salt formed in the steam distillation of said mixture.

3. The process of chlorinating copper phthalocyanine which comprises suspending dry finely divided solid copper phthalocyanine in chlorinated benzene, adding to the suspension finely divided sodium chloride in amount not substantially less than the amount of said copper phthalocyanine and a chlorination catalyst, passing chlorine gas through the resultant mixture while agitating and maintaining the mixture at a temperature of 160° to 170° C., and isolating the chlorinated copper phthalocyanine from the reaction mixture.

4. The process of halogenating an organic compound from the group consisting of dibenzanthrone, isodibenzanthrone, pyranthrone, anthanthrone, dibenzpyrenequinone, indanthrone, flavanthrone, indigo, thioindigo and phthalocyanine, which process comprises suspending said organic compound in finely divided solid form in an organic liquid from the group consisting of nitrobenzene, chlorinated benzenes, toluene, xylene and phthalic anhydride, adding an alkali metal halide from the group consisting of sodium chloride and potassium chloride to said suspension in amount not substantially less than the amount of said solid organic compound present in said suspension, introducing a halogen into said suspension and agitating the mixture to effect the halogenation of said compound, the alkali metal halide during said agitation effecting grinding and scraping of the surfaces of said organic compound to continuously expose fresh surfaces of said organic compound to attack by said halogen.

5. The process of chlorinating an organic compound from the group consisting of dibenzanthrone, isodibenzanthrone, pyranthrone, anthanthrone, dibenzpyrenequinone, indanthrone, flavanthrone, indigo, thioindigo and phthalocyanine, which process comprises suspending said organic compound in finely divided solid form in an organic liquid from the group consisting of nitrobenzene, chlorinated benzenes, toluene, xylene and phthalic anhydride, adding an alkali metal halide from the group consisting of sodium chloride and potassium chloride to said suspension in amount not substantially less than the amount of said solid organic compound present in said suspension, passing chlorine gas through said suspension while agitating said suspension, the alkali metal halide during said agitation effecting grinding and scraping of the surfaces of said organic compound to continuously expose fresh surfaces of said organic compound to attack by the chlorine.

References Cited in the file of this patent

UNITED STATES PATENTS

| | | |
|---|---|---|
| 1,042,679 | Holt | Oct. 29, 1912 |
| 1,982,313 | Kunz et al. | Nov. 27, 1934 |
| 2,027,914 | Krauer | Jan. 14, 1936 |
| 2,036,487 | Masterson | Apr. 7, 1936 |
| 2,276,860 | Niemann et al. | Mar. 17, 1942 |
| 2,586,598 | Barnhart et al. | Apr. 30, 1949 |
| 2,648,674 | Muehlbauer | Aug. 11, 1953 |
| 2,662,085 | Holtzman et al. | Dec. 8, 1953 |
| 2,677,693 | Nawiasky et al. | May 4, 1954 |
| 2,681,347 | Pedersen | June 15, 1954 |
| 2,786,062 | Vollman | Mar. 19, 1957 |
| 2,793,214 | Holtzman et al. | May 21, 1957 |

FOREIGN PATENTS

| | | |
|---|---|---|
| 815,088 | France | Apr. 5, 1937 |
| 852,912 | France | Nov. 9, 1939 |